United States Patent Office 2,752,340
Patented June 26, 1956

2,752,340
PROCESS OF PREPARING 16.17-OXIDO-PREGNENE COMPOUNDS

Gustav Ehrhart and Heinrich Ruschig, Bad Soden am Taunus, Josef Schmidt-Thomé, Frankfurt am Main-Unterliederbach, Werner Haede, Frankfurt am Main-Sindlingen, and Werner Fritsch, Frankfurt am Main-Rodelheim, Germany, assignors to Farbwerke Hoechst Aktiengesellschaft vormals Meister Lucius und Brüning, Frankfurt am Main Hochst, Germany No Drawing. Application February 9, 1953, Serial No. 336,022

Claims priority, application Germany February 11, 1952

7 Claims. (Cl. 260—239.55)

The present invention relates to a process of preparing 16,17-oxido-pregnene compounds.

It is known that the partial addition of oxygen to $\Delta^{5,16}$ pregnadienol-(3$\beta$)-one-20 acetate is successful when using an alkaline solution of hydrogen peroxide (J. Amer. Chem. Soc. 72 (1950), 5146). In this way 16,17-oxido-$\Delta^5$-pregnenol-(3$\beta$)-one-(20) is obtained. The double bond in 5,6-position, however, does not react at all under these conditions. Only the double bond in 16,17-position which is activated by the adjacent keto group enters into reaction.

Now we have found that 16,17-oxido-pregnene derivatives are likewise obtained in a good yield by treating $\Delta^{4,16}$-pregnadiene-3,20-diketones, in an alkaline medium, with hydrogen peroxide until the double bond in 16,17-position is saturated. It has been found that, in spite of the presence of two $\alpha,\beta$-unsaturated keto groups, in preference the double bond in 16,17-position adds oxygen and only after its saturation does the double bond in 4,5-position also enter into reaction. The reaction can easily be followed with the aid of the ultra-violet absorption band at 240 m$\mu$ which is characteristic of $\alpha,\beta$-unsaturated ketones. For $\Delta^{4,16}$-pregnadiene-3,20-diketones the molar extinction amounts to $\epsilon \sim 26,000$, for $\Delta^4$-pregnene-3,20-diketones to $\epsilon \sim 16,000$ (H. Dannenberg, Abhandl. preuss. Akad. Wiss., vol. 21, page 3 (1939); A. Butenandt and J. Schmidt-Thomé, Ber. deutsch. chem. Ges., vol. 72, page 182 (1939)). By following the alteration of the extinctions during the reaction, a marked fall in the reaction velocity can be observed at $\epsilon \sim 14,000\text{–}16,000$. If the reaction is interrupted at this stage, $\Delta^4$-16,17-oxido-pregnene-3,20-diketones can be isolated as the main reaction products.

As $\Delta^{4,16}$-pregnadiene-3,20-diketones there come into consideration, for instance, such compounds as are either unsubstituted or as contain in 21-position a halogen atom or a hydroxyl group that may be esterified or etherified.

In addition, such compounds may be used as contain in 11-position a keto or hydroxyl group that may be esterified or etherified. Further substituents may also be present.

It is of advantage to work in the presence of dilute alkalies and in solvents, especially alcohols, for instance methanol, ethanol, propanol and butanol. As alkalies there come into consideration: hydroxides of the alkali or alkaline earth metals or also their carbonates as far as they are soluble.

When using $\Delta^{4,16}$-pregnadienol-(21)-dione-(3,20) acetate and alkaline hydrogen peroxide, the reaction proceeds according to the following scheme

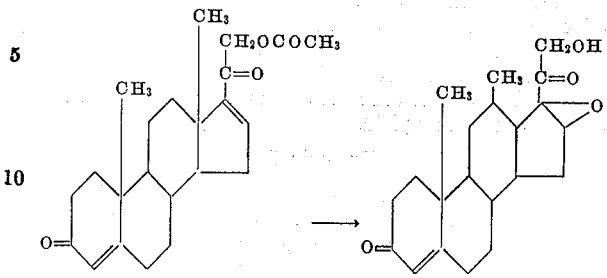

The reaction is surprising in so far as compounds of the type of desoxycorticosterone are, in an alkaline medium, very sensitive to oxidizing agents, for instance even to atmospheric oxygen, so that they are oxidized to the corresponding aetiocholenic acids (Bull. Soc. Chim. Jr. Mem., vol. 14, page 123 (1947)). However, in spite of the great excess of hydrogen peroxide, the ketol grouping is not oxidized under the conditions of the present invention. Moreover, it is known that oxidizing agents in an alkaline medium can open the ring A of $\Delta^{4,5}$-oxo-(3) compounds. (Fieser and Fieser: Natural products related to phenanthrene, 3rd edition, page 142.)

The substances obtained according to this invention are intended to serve as intermediate products for the manufacture of medicines.

The following examples serve to illustrate the invention but they are not intended to limit it thereto:

Example 1

1.1 grams of $\Delta^{4,16}$-pregnadienol-(21)-dione-3,20) are dissolved in 150 cc. of tertiary butanol and, after addition of 50 cc. of methanol, cooled to 0° C. 5 cc. of hydrogen peroxide of 35 per cent strength and 1.5 cc. of a 3 N-sodium methylate solution are added and the mixture is made up to 250 cc. with tertiary butanol. After 2 hours, the molar extinction at 240 m$\mu$ falls from 26,000 to 14,000. The reaction is stopped by adding 1 cc. of glacial acetic acid and the solution is, at 40° C. and under reduced pressure, concentrated to about 15 cc. The solution is poured into water and the precipitate is filtered, and shaken with ethyl acetate. A small quantity melting at 285° C. remains undissolved. This substance has not yet been examined more closely. The ethyl acetate solution is evaporated to dryness under reduced pressure. From the residue there is obtained in a good yield, after recrystallization from methanol, 16,17-oxido-$\Delta^4$-pregnenol-(21)-dione-(3,20) melting at 192° C.–196° C.

Example 2

0.2 gram of $\Delta^{4,16}$-pregnadienol-(21)-dione-(3,20) acetate are dissolved in 15 cc. of methanol. 0.8 cc. of hydrogen peroxide of 30 per cent strength and 0.4 cc. of 4 N-caustic soda solution are added and the whole is allowed to stand for 24 hours at +5° C. The reaction mixture is poured into 100 cc. of water and, after addition of 0.2 cc. of glacial acetic acid, it is concentrated to about 50 cc. at room temperature and under reduced pressure. Thereupon 20 cc. of a concentrated solution of sodium sulfate are added and the whole is allowed to stand for several hours. The precipitate that has formed is filtered off with suction and washed with a dilute solution of sodium carbonate. For acetylation, the dried substance is allowed to stand for 24 hours at room temperature in a mixture of 1 cc. of acetic anhydride and 1 cc. of pyridine. The acetylation product, which separates by pouring the mixture into water, is filtered off with suction and recrystallized twice from a mixture of methanol and water. In this way there is obtained 16,17-oxido-$\Delta^4$-pregnenol-(21)-dione-(3,20) acetate, melting at 170° C.–172° C.

*Example 3*

1 cc. of a hydrogen peroxide solution of 35 per cent strength and 0.06 cc. of a 3 N-sodium methylate solution are, at 0° C., added to 0.2 gram of 16-dehydro-progesterone in 20 cc. of methanol. The solution is allowed to stand for 4 hours at 0° C., 1 drop of glacial acetic acid is added and the whole is concentrated under reduced pressure to a few cc. After addition of water, the precipitate is filtered off and recrystallised twice from ether. The 16,17-oxido-progesterone melting at 202° C.–204° C. is obtained in a good yield.

*Example 4*

0.2 gram of 16-dehydroprogesterone is dissolved in 40 cc. of methanol. At 0° C. 2 cc. of a solution of hydrogen peroxide of 35 per cent strength and a solution of 50 milligrams of potassium carbonate in 2 cc. of water are added. After 3 hours there are added a further 1 cc. of hydrogen peroxide solution of 35 per cent strength and also 2 cc. of a potassium carbonate solution (50 milligrams of $K_2CO_3$). After a further 1½ hours the product is worked up in the same manner as described in Example 3. 16,17-oxido-progesterone melting at 202° C.–204° C. is likewise obtained in a good yield.

We claim:

1. The process which comprises reacting a $\Delta^{4,16}$-pregnadiene-3,20-diketone with hydrogen peroxide in an alkaline medium to thereby selectively introduce an epoxy group across the 16–17 carbon atoms, and terminating the reaction when the molar extinction has decreased at 240 m$\mu$ from about 26,000 to about 14,000.

2. The process which comprises reacting a $\Delta^{4,16}$-pregnadiene-3,20-diketone with hydrogen peroxide in an alkaline medium to thereby selectively introduce an epoxy group across the 16–17 carbon atoms, and adding glacial acetic acid to the reaction mass when the molar extinction has decreased at 240 m$\mu$ from about 26,000 to about 14,000 to thereby terminate the further introduction of epoxy groups.

3. The process as defined in claim 1, wherein said diketone is used as a solution in alcohol.

4. The process which comprises reacting $\Delta^{4,16}$-pregnadienol-(21)-dione-(3,20)-acetate with hydrogen peroxide in an alkaline medium comprising caustic soda to thereby selectively introduce an epoxy group across the 16–17 carbon atoms, and adding glacial acetic acid when the molar extinction has decreased at 240 m$\mu$ from about 26,000 to about 14,000 to thereby terminate the further introduction of epoxy groups.

5. The process which comprises reacting $\Delta^{4,16}$-pregnadienol-(21)-dione-(3,20) with hydrogen peroxide in an alkaline medium comprising sodium methylate to thereby selectively introduce an epoxy group across the 16–17 carbon atoms, and adding glacial acetic acid when the molar extinction has decreased at 240 m$\mu$ from about 26,000 to about 14,000 to thereby terminate the further introduction of epoxy groups.

6. The process which comprises reacting 16-dehydroprogesterone with hydrogen peroxide in an alkaline medium comprising potassium carbonate to thereby selectively introduce an epoxy group across the 16–17 carbon atoms, and adding glacial acetic acid when the molar extinction has decreased at 240 m$\mu$ from about 26,000 to about 14,000 to thereby terminate the further introduction of epoxy groups.

7. The process which comprises reacting 16-dehydroprogesterone with hydrogen peroxide in an alkaline medium comprising sodium methylate to thereby selectively introduce an epoxy group across the 16–17 carbon atoms, and adding glacial acetic acid when the molar extinction has decreased at 240 m$\mu$ from about 26,000 to about 14,000 to thereby terminate the further introduction of epoxy groups.

References Cited in the file of this patent

UNITED STATES PATENTS

| | | |
|---|---|---|
| 2,648,662 | Julian | Aug. 11, 1953 |
| 2,684,364 | Jones | July 20, 1954 |
| 2,686,181 | Julian | Aug. 10, 1954 |

OTHER REFERENCES

Plattner: Helv. Chem. Acta., vol. 30 (1947), pp. 385–394.

Chem. Reviews, vol. 45, August 1949, pp. 1–3, and 16–25.